United States Patent [19]

Koether et al.

[11] 4,278,872
[45] Jul. 14, 1981

[54] TEMPERATURE CONTROLLER WITH PULSED HEATING DURING IDLE

[75] Inventors: Bernard G. Koether, Westport; Gary G. Matison, Wilton, both of Conn.

[73] Assignee: Food Automation-Service Techniques, Inc., Stratford, Conn.

[21] Appl. No.: 62,069

[22] Filed: Jul. 30, 1979

[51] Int. Cl.³ .............................................. H05B 1/02
[52] U.S. Cl. .................................. 219/497; 219/442; 219/494; 219/506; 99/330
[58] Field of Search ............... 219/497, 494, 499, 501, 219/489, 441, 442, 508, 251, 506; 99/328, 330, 332, 333; 307/117

[56] References Cited

U.S. PATENT DOCUMENTS

| Re. 29,609 | 4/1978 | Wadia et al. | 219/441 |
|---|---|---|---|
| 3,577,908 | 5/1971 | Burg | 99/333 |
| 3,800,779 | 4/1974 | Moore et al. | 99/333 |
| 3,816,703 | 6/1974 | Binks | 99/333 |
| 3,824,243 | 10/1974 | Gregory | 219/497 |
| 3,883,753 | 5/1975 | Harrison, Jr. et al. | 219/494 |
| 3,894,483 | 7/1975 | Anetsberger et al. | 219/492 |
| 3,911,249 | 10/1975 | Keating | 219/489 |
| 4,010,412 | 3/1977 | Forman | 219/492 |
| 4,109,134 | 8/1978 | Van Herten | 219/499 |

FOREIGN PATENT DOCUMENTS 2717888  11/1978  Fed. Rep. of Germany ........... 219/497

*Primary Examiner*—Gene Z. Rubinson
*Assistant Examiner*—M. Paschall
*Attorney, Agent, or Firm*—Cifelli & Frederick

[57] ABSTRACT

A temperature controller for use with a fryer of the type comprising a vat containing cooking oil and heater, such as a gas burner or electrical heating element, for heating cooking oil comprises a temperature probe for sensing the temperature of the cooking oil, a temperature selector switch producing a signal corresponding to the selected temperature for the cooking oil and also producing a signal corresponding to a normal temperature approximately 25° below the selected temperature. A heat demand comparator produces a heat demand signal when the temperature of the cooking oil is below the selected temperature. A normal temperature comparator compares the temperature of the cooking oil with the normal temperature and provides a signal when the cooking oil is in the normal temperature range, and a cooking gate inhibits this signal if cooking is taking place in the fryer. A heating element control oscillator provides pulses. A gate passes the heat demand signal to operate the heater in a full on mode when the temperature of the cooking oil is below the normal temperature or when the temperature of cooking oil is below the selected temperature and cooking is taking place in the fryer. If the temperature of the cooking oil is in the normal range and no cooking is taking place in the fryer, the gate gates the pulses from the heating element control oscillator to operate the heater in a pulsed mode which minimizes overshoot of the temperature beyond the selected temperature. A melt cycle comparator determines if the temperature of the cooking oil is below a melt cycle reference temperature of approximately 190°, and causes the gate to operate the heating means in the pulsed mode until the melt cycle reference temperature is attained. An open switch comparator monitors the temperature selector switch for an output, and inhibits operation of the heating means if there is no output. An open probe comparator and a shorted probe comparator monitor the probe signal for open or shorted condition, respectively, and also inhibit operation of the heater if the probe is open or shorted.

16 Claims, 3 Drawing Figures

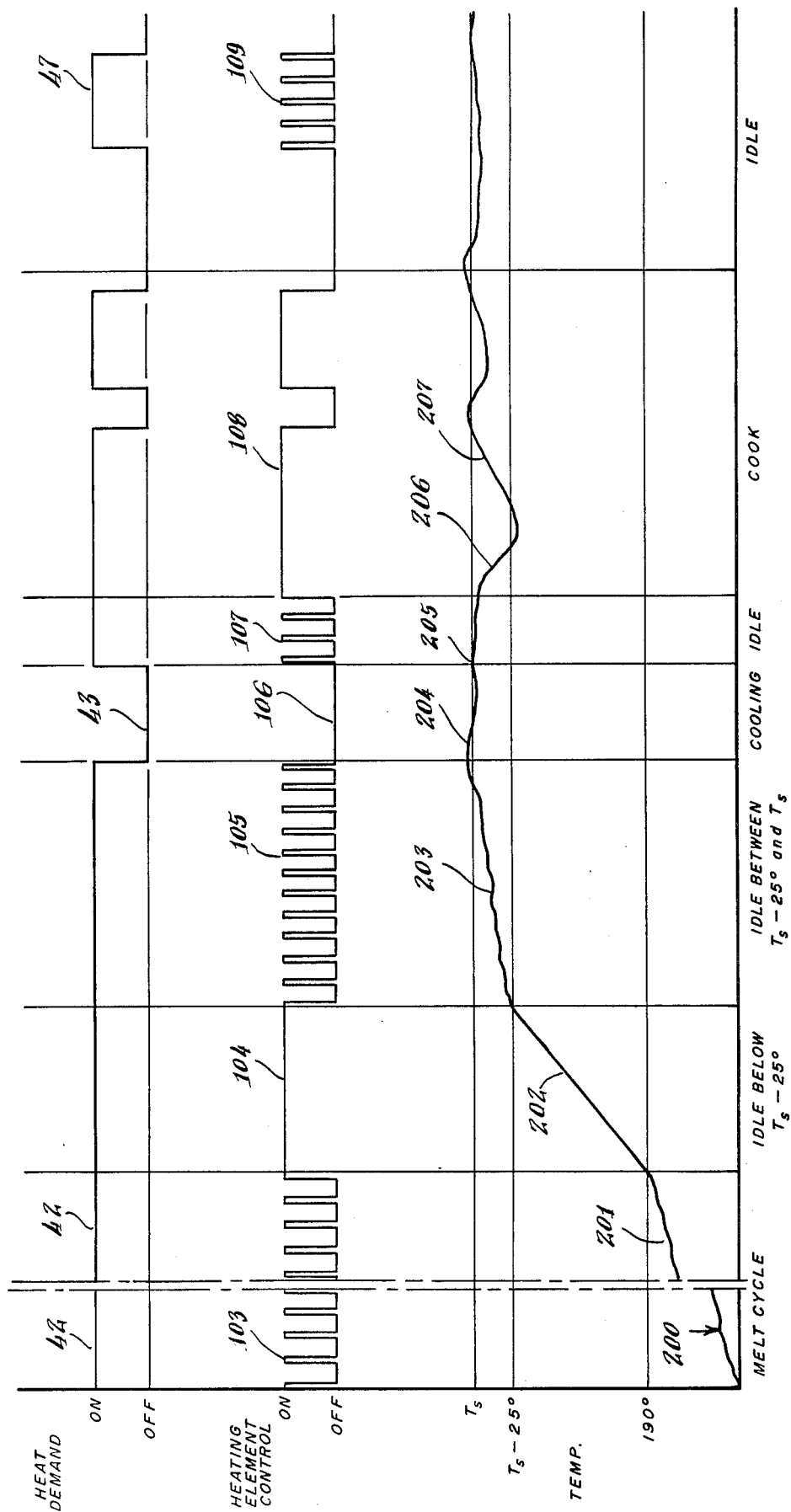

TEMPERATURE CONTROLLER WITH PULSED HEATING DURING IDLE

BACKGROUND OF THE INVENTION

This invention relates to a temperature controller for use with deep fat fryers or the like and which provide for pulsed operation of the heating element in non-cooking heat demand periods, thereby minimizing temperature overshoot of the cooking oil above the selected temperature. The invention further relates to a temperature controller which monitors for probe failure and for temperature selector switch misfunction or failure and takes protective action in response to those events.

Deep fat fryers are commonly used in restaurants and particularly fast-food type restaurants for preparing foods, such as deep-fat fried potatoes, chicken, fish, onion rings, etc. The deep fat fryers generally comprise a vat containing shortening or other cooking oil and heating means for heating the cooking oil. In some fryers, a gas burner is provided under the vat, and in other fryers electrical resistance heating elements are provided within the vat. Deep fat fryers generally incorporate a thermostat, including a temperature sensor for determining the temperature of the cooking oil, means for selecting a desired temperature for the cooking oil, and heat control means which turn on the heating means when the temperature of the cooking oil falls below the selected temperature.

Many cooking oils, such as shortening, are solid at room temperature, and special care must be taken in operating the fryer to melt the solid shortening. If the heating means is permitted to remain on for a substantial period of time when the shortening is solid, hot spots can develop which may damage the fryer structure and which also tend to scorch the shortening, making it unsuitable for use in cooking food. One solution to this problem is found in U.S. Pat. No. 3,800,779 in which a melt cycle control system is added to the thermostat of the fryer. The melt cycle control system of that patent causes the heating element of the fryer to operate for intermittent periods until liquid shortening reaches a predetermined level in the vat, and thereafter permits the usual thermostat action. After the shortening is melted, it becomes an effective heat sink which protects against isolated hot spots in the fryer structure and also prevents the shortening itself from overheating.

Once the shortening is in its liquid state, the conventional fryer thermostat control calls for continuous operation of the heating means of the fryer when the temperature of the cooking is below the selected temperature. Once the cooking oil reaches the selected temperature (or slightly above the selected temperature), the heating means is turned off and remains off until the temperature of the cooking oil has coasted back to a temperature slightly below the selected temperature. One problem with such a thermostat control is that when the fryer is idling, i.e. not being used for a cooking operation but maintaining the cooking oil at or near the selected temperature in preparation for cooking, full and continuous operation of the heating elements tends to cause the temperature of the cooking oil to overshoot the selected temperature. Thus, the cooking oil may be above the selected cooking temperature when the food item is produced. Also, extra energy is used in heating the cooking oil in this manner when the fryer is idling.

SUMMARY OF THE INVENTION

It is a principal object of the invention herein to provide a temperature controller for efficiently operating the heating means of a deep fat fryer.

It is another object of the invention herein to provide a temperature controller for a deep fat fryer which prevents the cooking oil from overshooting a selected temperature.

It is another object of the invention herein to provide a temperature controller for a deep fat fryer which has separate operating modes for cook and idle conditions.

It is a further object of the invention herein to provide a temperature controller for a deep fat fryer which monitors its operation and takes protective action in the event of malfunction.

A temperature controller according to the invention herein operates the heating means of a deep fat fryer in a pulsed mode during a melt cycle and in a full on mode thereafter until the cooking oil reaches the low end of a normal temperature range. The normal temperature range includes at its upper end a selected temperature and may extend below the selected temperature over approximately 25°, i.e. in the normal range the cooking oil is relatively near the selected temperature and is at a suitable temperature for cooking food items. In the normal temperature range, the temperature controller operates the heating means of the fryer in a pulsed mode. This brings the cooking oil up to the selected temperature more slowly, and prevents overshoot of the temperature of the cooking oil above the selected temperature. Also, the temperature controller is set to pulse the heating elements when the temperature falls below the selected temperature by a small amount, and in general, closer control of the temperature may be maintained.

If cooking of food items is undertaken, the temperature controller overrides the pulsing mode and operates the heating elements in a full on mode, as greater heat input is required for cooking than for idling.

The temperature controller includes a temperature selector switch for selecting a desired temperature of the cooking oil and has means for monitoring whether the temperature selector switch is properly engaged. It also monitors a temperature probe for open and short failures. If one of these problems occurs, the temperature controller provides a signal which may either inhibit operation of the heating means of the fryer or transfer thermostatic control of the fryer to a backup thermostat system, such as the one normally provided with the fryer upon manufacture.

Other and more specific objects and features of the invention herein will be apparent to those skilled in the art from a reading of the following description of the preferred embodiment and the claims, taken together with the drawings.

DRAWINGS

FIG. 3 is a multipart graphic diagram illustrating the operation of the temperature controller of FIG. 1.

The same reference numerals refer to the same elements throughout the various Figures.

DESCRIPTION OF PREFERRED EMBODIMENT

Figure 1:
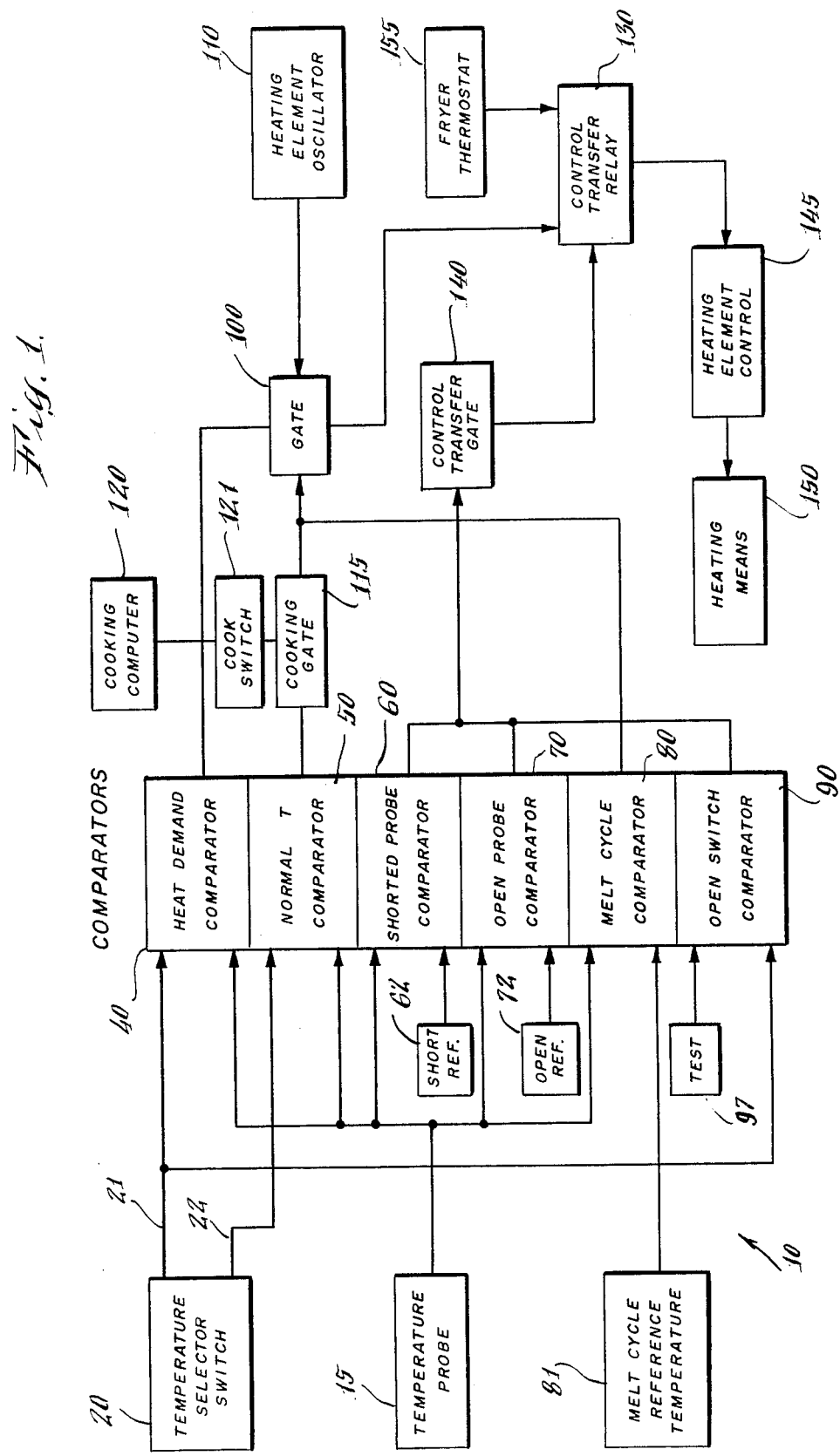
FIG. 1 is a functional block diagram of a temperature controller according to the invention herein.

With reference to FIG. 1, there is shown a block diagram of a temperature controller 10 according to the invention herein for use with a deep fat fryer. The temperature controller 10 first comprises a temperature selector switch 20, which produces a signal corresponding to a selected temperature for the cooking oil on line 21. Temperature selector switch 20 also produces a signal on line 22 corresponding to a normal temperature, which in the preferred embodiment is the selected temperature minus approximately 25°. Thus, there is a normal temperature range established between the selected temperature and 25° below the selected temperature. The normal temperature range is preferably, but not necessarily approximately 25°; the 25° range being chosen because the cooking oil is hot enough to accomplish cooking within that range; however, the normal range could be extended or narrowed as desired.

A temperature probe 15, which may comprise a thermistor or similar type sensing temperature element immersed in the cooking oil of the deep fat fryer, provides a signal corresponding to the temperature of the cooking oil. The temperature probe is preferably a distinct element associated with the temperature controller 10 and any temperature sensing element or probe normally associated with the fryer is preferably used in a backup mode with an extant fryer thermostat 155, as will be more fully discussed below.

The temperature controller 10 further comprises a plurality of comparators. A heat demand comparator 40 compares the temperature probe signal with the signal corresponding to the temperature selected by the temperature selector switch, and produces a heat demand signal when the cooking oil temperature is below the selected temperature. The normal temperature comparator 50 compares the temperature probe signal with the normal temperature signal and produces a signal when the cooking oil temperature is within the normal range. A shorted probe comparator 60 compares the signal from the temperature probe with an internally produced short reference signal 62, and the shorted probe comparator 60 produces a signal when it senses that the temperature probe is shorted. Similarly, an open probe comparator 70 compares the signal from the temperature probe with a generated open reference signal 72 and produces a signal if it senses that the temperature probe is open. A melt cycle comparator 80 compares the signal from the temperature probe 15 with a melt cycle reference temperature, generated at 82, and produces a signal if the temperature of the cooking oil is below the melt cycle reference temperature. The melt cycle reference temperature is preferably set at 190°. Lastly, an open switch comparator 90 receives the signal from the temperature selector switch, and produces a signal if no signal is emanating from the temperature switch, indicating that the temperature selector switch has failed or has been set in such a manner that no temperature is selected.

A gate 100 controls whether the heating means 150 of the fryer is operated in a pulsed mode or a full on mode when the heat demand comparator 40 calls for the heating means to be operated. Thus, one input to the gate 100 is the signal from the heat demand comparator. The gate 100 also receives an output of a heating element oscillator 110, which provides pulses of short duration for operating the heating means in the pulsed mode. A third input to the gate 100 is from the normal temperature comparator or the melt cycle comparator, this signal indicating that the pulsed mode is desired because the temperature of the cooking oil is sufficiently low to require pulsing during a melt cycle or is within the normal temperature range. However, the signal from the normal temperature comparator is disabled by a cooking gate 115 if cooking is in progress, in order that the full on mode with maximum heating will occur during cooking. The cooking gate 115 is normally operated by a cook switch 121 associated with a cooking computer 120 used for timing the cooking of food items in the fryer. Alternatively, the cooking gate 100 could be operated by a cook switch not associated with a cooking computer, e.g. as a part of an automatic basket lowering apparatus.

The gate 100 passes a signal from the heating demand comparator through a control transfer relay 130 to a fryer heating element control 145, which operates heating means 150 of the fryer. If the cooking oil is in the normal temperature range and no cooking is in progress, the gate 100 permits the pulses from the heating element oscillator 110 to interrupt the heat demand signal. Thus, a pulsed mode of operation of the heating means is accomplished when the fryer is idling. If cooking is in progress, the gate 100 does not gate the heating element oscillator with the heat demand signal, whereby the heating means 150 may be operated in its full on mode.

If the temperature probe is either open or shorted, or the temperature selector switch misfunctions, the signal from the monitoring comparator operates a transfer control gate 140, which in turn operates a transfer control relay 130. In the embodiment shown, operation of the transfer control relay switches control of the heating element control 145 and hence the heating means 150 of the fryer from the temperature controller 10 to an extant fryer thermostat 155. In the event that the fryer does not have its own thermostat, the transfer control relay simply disables operation of the heating element control 145 and hence the heating means 150. The heating element control means may comprise a valve or a switch which supplies, respectively, fuel or electrical power to a gas burner or electrical resistance heating means of the fryer.

Figure 2:
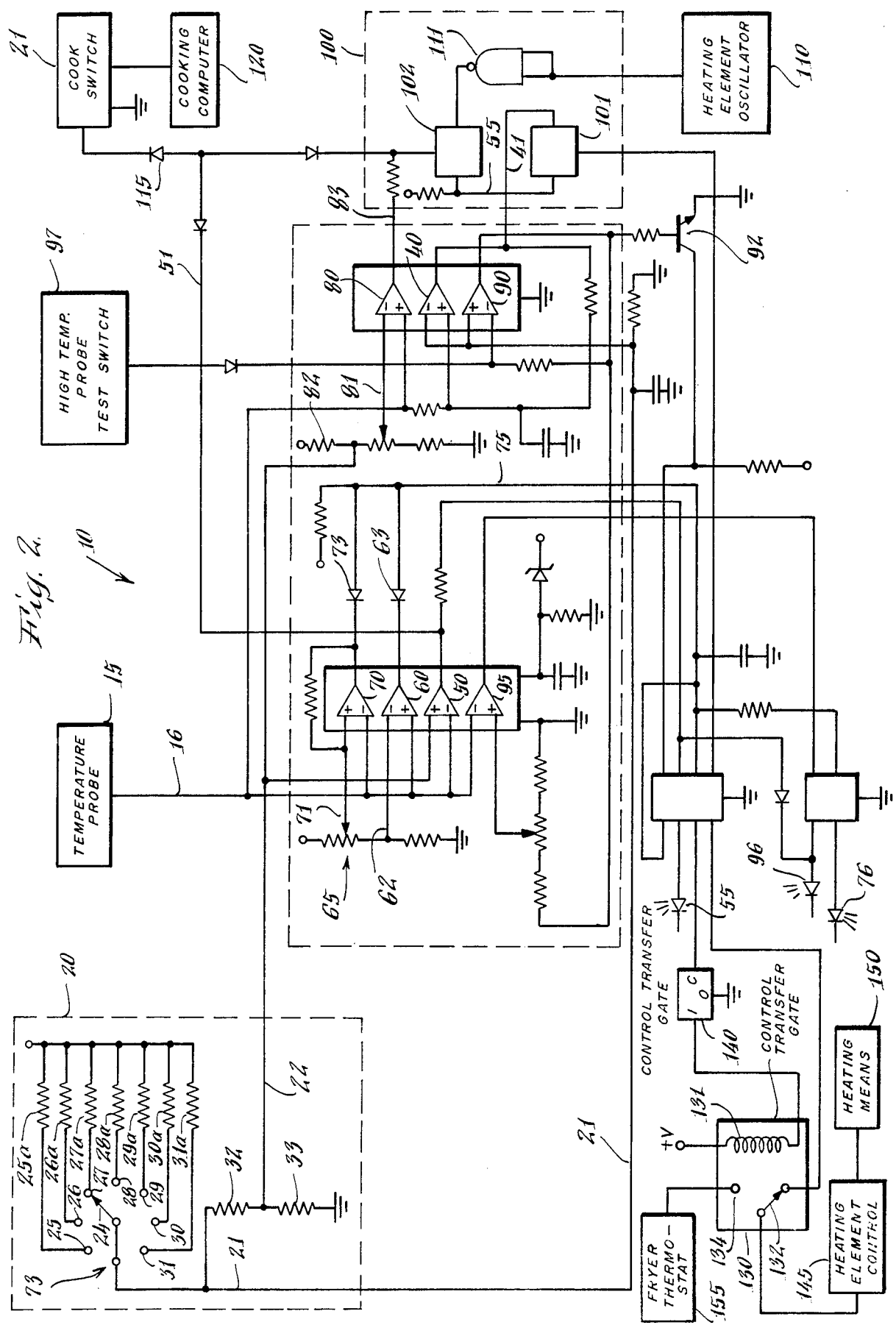
FIG. 2 is a schematic circuit diagram of the temperature controller of FIG. 1.

With reference to FIG. 2, the schematic circuit diagram of the temperature controller 10 is shown. The temperature selector switch 20 comprises a mechanical switch 23 having a rotatable contact arm 24 which is manually operable to contact terminals 25–31. Resistors 25a–31a are respectively connected between the terminals 25–31 and a voltage source with each resistor providing for a different selected temperature. Thus, temperature reference signal corresponding to a selected temperature is provided on line 21, the signal depending upon the position of contacted arm 24. The normal temperature signal is derived from the selected temperature signal by a voltage divider network of resistors 32 and 33, the normal temperature signal corresponding to a temperature approximately 25° less than the selected temperature. The normal temperature signal is provided on line 23.

The temperature probe 15 provides a signal on line 16, the signal corresponding to the temperature of the cooking oil. The temperature probe may comprise a thyristor, thermistor or other heat sensing element immersed in the cooking oil, as is well known in the art.

The heat demand comparator 40 receives as inputs the temperature probe signal and the selected temperature signal, providing a high heat demand signal on line 41 when the temperature of the cooking oil is lower than the selected temperature. The heat demand signal on line 41 is input to switch 101, which is a part of gate 100. The normal temperature comparator 50 receives the normal temperature signal on line 22 and also receives the signal from the temperature probe 15. When the temperature of the cooking oil is above the normal temperature, i.e. the bottom of the normal temperature range, the normal temperature comparator 50 produces a high normal temperature signal on line 51, which closes switch 102, also a part of gate 100. The normal temperature output signal of the normal temperature comparator 50 also lights a normal LED 55, which may be mounted on a housing for the temperature controller 10 and appropriately labeled for informing the operator that the temperature of the cooking oil is within the normal range.

The melt cycle comparator 80 receives the signal from the temperature probe 15, and also receives as an input on line 81 a signal corresponding to a desired termination temperature (melt cycle reference temperature) for the melt cycle. This is derived from a voltage divider network generally indicated at 82. In the preferred embodiment, the melt cycle reference temperature is preferably approximately 190°, and the melt cycle comparator 80 provides a high output on line 83 whenever the temperature of the cooking oil is below the melt cycle reference temperature. The signal, on line 83 intersecting line 51, is also applied to close switch 102 of the gate 100.

The cooking gate 115 may comprise a diode 115 which connects the lines 51 and 83 with a cook switch 121, which may be associated with a cooking computer 120. When the cook switch is operated, it pulls down any high signal on lines 51 or 83 through diode 115, thereby disabling the high signal to the switch 102 of gate 100. The input to the switch 102 is from the heating element oscillator 110, the oscillator providing a series of short duration pulses. Thus, the heating element oscillator 110, inverted at 111, is gated through switch 102 when the melt cycle comparator 80 or the normal temperature comparator 50 are producing high outputs, unless disabled by the cook switch and cooking gate 121 and 115.

Switch 101 is normally closed from the signal on line 55, and thereby normally passes any heat demand signal coming in on line 41. However, when switch 102 is closed, the inverted heating element oscillator signal intermittently opens switch 101, interrupting the passage of the heat demand signal whereby the heat demand signal is converted to pulses.

In the pulse mode, the heating means is preferably on for periods of approximately 5 seconds followed by approximately 15-25 seconds of off time.

The output of gate 100, whether pulsed or steady, is provided through control transfer relay 130 to heating element control 145, which may be a valve, relay, or the like which turns on the heating means 150 of the fryer.

With reference to FIG. 3, there is shown in graphic form the heat demand signal from the heat demand comparator 40 the output from gate 100 to the heating element control 145 and a graph showing the temperature of shortening in the fryer, all illustrating the operation of the temperature controller 10. Initially, the shortening is cold whereby the heat demand signal is high, shown at 42. Since the temperature of the shortening is below the melt cycle reference temperature of 190°, the temperature controller 10 is in a melt cycle and in particular, the melt cycle comparator 80 closes switch 102, thereby gating the heating element oscillator 110 to intermittently open switch 101, whereby the passage of the heat demand signal through switch 101 to the heating element control 145 is pulsed and the heating means 150 is operated in a pulsed mode. This is illustrated by pulses 103 on the graph of FIG. 3. During the melt cycle, the temperature of the shortening rises slowly shown by the gradual slope of temperature line 200 at portion 201. When it reaches 190°, the melt cycle comparator output goes low and switch 102 opens. The heat demand signal remains high, and is gated through switch 102 without pulsed interruption in order to operate the heating means in the full on mode, as indicated at 104. The temperature of the cooking oil, as shown at portion 202 of the temperature line 200, rises rapidly. When the temperature of the cooking oil reaches the low end normal range, indicated by "Ts-25°" in FIG. 3, the normal temperature comparator closes the switch 102, thereby gating the heating element oscillator to switch 101 and again causing the heating means to be operated in a pulsed mode, as indicated at 105, with the heat demand signal still high at 42. As can be seen at portion 203 of the temperature line 200, the temperature of the cooking oil rises more slowly and with minor fluctuations due to the pulsed operation of the heating means. Thus, the temperature of cooking oil approaches the selected temperature somewhat gradually, and has minimal or no overshoot, as indicated at 204. Once the temperature of the cooking oil has reached the selected temperature, indicated "Ts" in FIG. 3, the heat demand signal goes low, as indicated at 43, and the output of gate 100 for operating the heating means is also off, as indicated at 106. When the temperature of the cooking oil falls below the selected temperature, as indicated at 205, the heat demand comparator again produces a high heat demand signal, as indicated at 44, and because the temperature of the cooking oil is in the normal range, a pulsed output from gate 100 to operate the heating means is provided, as indicated at 107. Because the pulsed operation of the heating means prevents overshoot of the selected temperature, the heat demand comparator is set up to come on when the temperature of the cooking oil is only slightly below the selected temperature, i.e. the temperature controller 10 provides for close control of the shortening temperature.

When a cook operation has commenced, the output from the normal temperature comparator to switch 102 is disabled, whereby switch 102 is open and the heating element oscillator 110 is not gated therethrough. Thus, if the heat demand signal is high, as indicated at 44, the output of gate 100 to the heating element control 145 causes full on mode operation of the heating means, as indicated at 108. Thus, the temperature controller 10 operates in the usual fashion of providing maximum heat when necessary during cooking, and this is desirable because the temperature of the cooking oil sometimes falls rapidly when cold food items are placed therein, as indicated at 206, requiring quick recovery as indicated at 207. When cooking has been completed, cooking gate 115 ceases to disable the signal from the normal temperature comparator, whereby upon a heat demand signal 47 produces a pulsed output 109 from the gate 100.

The temperature controller 10 also has protective features contributing to its safe operation of a fryer. The shorted probe comparator 60 receives the signal from the temperature probe 15 as one input, and compares it with a signal derived from the lower resistor 62 of voltage divider resistor network generally indicated at 65. Open probe comparator 70 also receives the signal from the temperature probe and compares it with a different reference signal received from resistor 72 from the voltage divider network 65. In accordance with preferred fail safe provisions, the signals from both the shorted probe comparator 60 and the open probe comparator 70 are normally high, and a high signal is provided on line 75 to close the control transfer switch 140. When the control transfer switch 140 is closed, coil 131 of the control transfer relay 130 is active, pulling contactor 132 against terminal 133, whereby the signal from gate 100 is provided to the heating element control 145 to operate the heating means 150. However, if the temperature probe 15 becomes open or shorted, the signal on line 75 is pulled down through diodes 63 or 73, respectively, opening the control transfer gate 140. Thus, the coil 131 is deactivated and contactor 132 is released and biased against terminal 134, thereby permitting the fryer thermostat 135 to operate the heating element control 145 and heating means 150. If there is no fryer thermostat, the operation of the heating means 150 is merely disabled. The high signal on line 75 also lights an automatic probe test LED 76 indicating the probe is operative.

As a further safety feature which is a specific feature of the invention, the temperature selector switch 20 is monitored for failure or misfunction. The main problem to be guarded against is that the arm 24 of the temperature selector switch 20 might be set between terminals, thus providing no signal. Accordingly, the signal from temperature selector switch 20 is provided to an open switch comparator 90. The output of the open switch comparator 90 is normally high and is used to drive a high temperature comparator 95, which also receives the signal from the temperature probe 15 and lights LED 96 if the temperature of the cooking oil exceeds the safe range. A high temperature probe test switch 97 is also provided as input to the open switch comparator 90, which simulates the high temperature cooking oil condition to test the operation of the high temperature comparator 95 and associated LED 96.

However, if the temperature selector switch signal is zero, i.e. there is no output from the temperature selector switch, the output of the open switch comparator 90 goes low and opens the control transfer gate 140 through a transistor 92. Audible alerts, not shown, may also be provided upon any one of the failures in order to inform the operator.

Accordingly, there has been described above a temperature controller 10 which admirably achieves the objects of the invention herein. It will be appreciated that various changes and modifications may be made from the preferred embodiment described above, which is illustrative only, without departing from the spirit and scope of the invention, which is limited only by the following claims.

We claim:

1. A temperature controller for use with a fryer of the type comprising a vat containing cooking oil, heating means for heating the cooking oil and a heating element control for operating the heating means, the temperature controller comprising:

(A) a temperature sensor for sensing the temperature of the cooking oil;

(B) a temperature selector for selecting a selected temperature for the cooking oil;

(C) means establishing a normal temperature range extending between the selected temperature and a temperature below the selected temperature;

(D) comparator and gate means operating the heating element control and thereby the heating means when the temperature of the cooking oil is below the selected temperature, said comparator and gate means operating the heating element control and thereby the heating means (1) in a full on mode when the temperature of cooking oil is below the selected temperature and cooking is taking place or when the temperature of the cooking oil is below the normal temperature range and (2) in a pulsed mode when the temperature of the cooking oil is in the normal temperature range and no cooking is taking place, whereby overshoot of the temperature of the cooking oil above the selected temperature is minimized when the cooking oil is heated with the fryer in noncooking operation.

2. The temperature controller as defined in claim 1 wherein the normal temperature range is between the selected temperature and the selected temperature minus approximately 25°.

3. The temperature controller as defined in claim 1 wherein when the heating element control and thereby the heating means are operated in the pulsed mode, the heating means are on for approximately 5 seconds and are thereafter off for approximately 15–30 seconds.

4. The temperature controller as defined in claim 1 wherein said comparator and gate means operate the heating element control and thereby the heating means (3) in a pulsed mode when the temperature of the cooking oil is below a melt cycle reference temperature.

5. The temperature controller as defined in claim 4 wherein the melt cycle reference temperature is approximately 190°.

6. The temperature controller as defined in claim 1 and further comprising:

(E) means monitoring the output of the temperature selector switch and inhibiting operation of the heating element control and thereby the heating means by the temperature controller if the temperature selector switch is not producing a signal corresponding to a selected temperature.

7. The temperature controller as defined in claim 6 and further comprising:

(F) means monitoring the temperature sensor for an open condition or a short condition and inhibiting operation of the heating element control and thereby the heating means by the temperature controller if the temperature sensor is open or shorted.

8. A temperature controller for use with a fryer of the type comprising a vat containing cooking oil, heating means for heating the cooking oil and a heating element control for operating the heating means, the temperature controller comprising:

(A) a temperature probe producing a signal corresponding to the temperature of the cooking oil;

(B) a temperature selector switch producing (1) a signal corresponding to a selected temperature for the cooking oil and (2) a signal corresponding to a normal temperature below the selected temperature for the cooking oil, thereby establishing normal temperature range between the normal temperature and the selected temperature;

(C) a heat demand comparator which compares the signal corresponding to the selected temperature with the signal from the temperature probe and produces a heat demand signal when the temperature of the cooking oil is below the selected temperature;

(D) a normal temperature comparator which compares the normal temperature signal with the signal from the probe and produces a signal when the temperature of the cooking oil is in the normal temperature range;

(E) a cooking gate which inhibits the output signal from the normal temperature comparator if cooking is taking place in the fryer;

(F) a heating element oscillator;

(G) a gate which
 (1) passes the heat demand signal to operate the heating element control and thereby the heating means when the temperature of the cooking oil is below the normal temperature or when the temperature of the cooking oil is below the selected temperature and cooking is taking place in the fryer, or
 (2) gates the output of the heating element oscillator with the heat demand signal to operate the heating element control and thereby the heating means in a pulsed mode when the temperature of the cooking oil is in the normal range and no cooking is taking place in the fryer.

9. The temperature controller as defined in claim 8 wherein the normal temperature is approximately 25° below the selected temperature.

10. The temperature controller as defined in claim 8 and further comprising:

(H) a melt cycle comparator which compares the signal from the temperature probe with a melt cycle reference temperature signal and produces an output to the gate when the temperature of the cooking oil is below the melt cycle reference temperature signal wherein the gate
 (3) gates the output of the heating element oscillator with the heat demand signal to operate the heating element control and thereby the heating means in a pulsed mode when the temperature of the cooking oil is below the melt cycle reference temperature.

11. The temperature controller as defined in claim 10 wherein the melt cycle reference temperature is 190°.

12. The temperature controller as defined in claim 8 and further comprising:

(H) an open switch comparator for ascertaining that the temperature selector switch is producing a signal;

(I) means interrupting the signal from the gate to the heating element control when the open switch comparator has sensed that the temperature selector switch is not providing a signal, thereby inhibiting operation of the heating element control and thereby the heating means.

13. The temperature controller as defined in claim 12 wherein the fryer further comprises a thermostat control and further comprising:

(J) a control transfer gate energizing the coil of a control transfer relay, wherein the signal from the open switch comparator upon sensing that the temperature selector switch is not producing a signal causes the control transfer gate to deenergize the coil of the control transfer relay, whereby the control transfer relay places control of the heating element control and thereby the heating means of the fryer with the fryer thermostat.

14. The temperature controller as defined in claim 13 and further comprising:

(K) an open probe comparator for sensing an open condition of the temperature probe; and (L) a shorted probe comparator for sensing a shorted condition of the temperature probe, wherein upon sensing an open or shorted condition of the temperature probe, the open probe comparator or shorted probe comparator, respectively, cause the control transfer gate to deenergize the coil of the control transfer relay, whereby the control transfer relay places control of the heating element control and thereby the heating means of the fryer with the fryer thermostat.

15. A method of operating the heating means of a fryer to heat cooking oil therein comprising:

(A) selecting a selected temperature for the cooking oil of the fryer;

(B) sensing the actual temperature of the cooking oil of the fryer;

(C) selecting a normal temperature range extending from the selected temperature to a lower temperature;

(D) operating the heating means in a full on mode when the temperature of the cooking oil is below the normal range or is in the normal range and cooking is taking place in the fryer; and (E) operating the heating means of the fryer in a pulsed mode when the temperature of the cooking oil is below the normal range and no cooking is taking place in the fryer.

16. The method of operating the heating means of the fryer as defined in claim 15 when the heating means is operated in a pulsed mode it is on for approximately 5 seconds and is thereafter off for approximately 15–30 seconds.

* * * * *

UNITED STATES PATENT AND TRADEMARK OFFICE
CERTIFICATE OF CORRECTION

PATENT NO. : 4,278,872

DATED : July 14, 1981

INVENTOR(S) : Bernard G. Koether and Gary G. Matison

It is certified that error appears in the above-identified patent and that said Letters Patent is hereby corrected as shown below:

At column 10, line 50:

for "below" read -- in --.

Signed and Sealed this

Fifteenth Day of September, 1987

Attest:

DONALD J. QUIGG

*Attesting Officer*    *Commissioner of Patents and Trademarks*